US008738722B1

(12) United States Patent
Gass et al.

(10) Patent No.: US 8,738,722 B1
(45) Date of Patent: May 27, 2014

(54) ENVIRONMENT AND METHODS FOR FOSTERING ACTION SPORT COMPETITION

(71) Applicant: Tricky, LLC, Los Angeles, CA (US)

(72) Inventors: Sam Gass, Los Angeles, CA (US); William Bater, Los Angeles, CA (US); Nicholas Brown, Los Angeles, CA (US)

(73) Assignee: Tricky, LLC, Los Angeles, CA (US)

( * ) Notice: Subject to any disclaimer, the term of this patent is extended or adjusted under 35 U.S.C. 154(b) by 0 days.

(21) Appl. No.: 14/170,032

(22) Filed: Jan. 31, 2014

Related U.S. Application Data

(60) Provisional application No. 61/844,071, filed on Jul. 9, 2013, provisional application No. 61/831,548, filed on Jun. 5, 2013.

(51) Int. Cl.
G06F 15/16 (2006.01)

(52) U.S. Cl.
USPC .......................................... 709/206; 709/204

(58) Field of Classification Search
USPC ............... 709/204, 206, 217; 707/608; 705/7; 455/456.3
See application file for complete search history.

(56) References Cited

U.S. PATENT DOCUMENTS

| 8,566,348 | B2* | 10/2013 | Rinearson et al. | 709/217 |
| 8,595,297 | B2* | 11/2013 | Marcucci et al. | 709/206 |
| 2011/0054959 | A1* | 3/2011 | Edwards et al. | 705/7 |
| 2013/0173531 | A1* | 7/2013 | Rinearson et al. | 707/608 |
| 2013/0218973 | A1* | 8/2013 | Good et al. | 709/204 |
| 2013/0231139 | A1* | 9/2013 | Zhang | 455/456.3 |

* cited by examiner

Primary Examiner — Quang N Nguyen
(74) Attorney, Agent, or Firm — Choate, Hall & Stewart LLP; William R. Haulbrook; John J. Cahill

(57) ABSTRACT

An online platform for fostering action sports competition allows individual athletes to upload media documenting their action sport performance. The online platform may enable the user to participate in an online competition against other users of the same sport. Other platform users may promote or demote a particular competitor within the competition. The user feedback may be used to rank the competitors.
Through the competition-fostering platform, users may search for action sports activities using a number of search criteria and rate other users' (e.g., competitors) uploaded media clips found in the search results. Such a platform may rank users based on a variety of parameters and award prizes to users for their activity. The platform may also provide vendors and other sponsors a medium by which they can provide users with awards, sponsor competitions, and promote their own organization.

11 Claims, 16 Drawing Sheets

ENVIRONMENT AND METHODS FOR FOSTERING ACTION SPORT COMPETITION

CROSS-REFERENCE TO RELATED APPLICATION

This application claims priority to and the benefit of, and incorporates herein by reference in its entirety, U.S. Provisional Patent Application No. 61/831,548, filed Jun. 5, 2013. This application also claims priority to and the benefit of, and incorporates herein by reference in its entirety, U.S. Provisional Patent Application No. 61/844,071, filed Jul. 9, 2013.

BACKGROUND

Traditional methods of sharing an action sports clip with fellow athletes electronically involve capturing a video recording a live performance of an individual's performance, transferring the video clip to a personal computer, and uploading the video clip to the Internet. Current methods and systems for sharing an action sports clip electronically do not provide a platform for athletes to upload video recordings of their performance and compete against each other by comparing each athlete's respective performance.

SUMMARY

In one aspect, the present disclosure describes a method including receiving, over a network from a remote computing device, a member submission including a video including an action sport activity, location information identifying a location of video capture, member identifying information, and an identification of the action sport activity; providing, to a number of members, network-based access to reviewing the video. The method may include providing a control configured, upon selection, to submit a rating associated with the video. The network-based access may be provided based upon one or more of a location identification, received from a respective member of the number of members. The method may include identifying a geographic location within a predetermined range of the location of video capture, a member identification, received in relation to the member submission, of two or more particular members of the number of members, an activity identification, received from a respective member of the number of members. The method may include identifying the action sport activity, and a competition identification, received from a respective member of the number of members, where the member submission was submitted in relation to a competition identified by the competition identification. The method may include receiving, from at least a subset of the number of members, responsive to providing access to reviewing the video, a respective rating. The method may include determining, by a processor of a computing device, based upon a number of ratings received from the subset of the number of members, an overall rating. The method may include accessing, by the processor, one or more additional member submissions, where the one or more additional member submissions share at least one of the location of video capture, the competition identification, and the activity identification. The method may further include identifying, by the processor, from the member submission and the one or more additional member submissions, a highest rated member submission.

In some embodiments, the method includes applying an indication of rank to a member account associated with the highest rated member submission. The action sport activity may be a skateboard trick. The competition may be associated with a sponsor. The location information may include GPS data. The number of members may include at least one team of members.

In some embodiments, accessing the one or more additional member submissions includes accessing a competing member submission, where the member submission and the competing member submission correspond to a competition between members of an action sports activity community. Prior to receiving the member submission, a first member associated with the member submission may be identified. Similarly, a second member associated with the competing member submission may also be identified prior to receiving the member submission. The first member and the second member may be identified based on one or more of a geographic region, an age range, a skill level, and an indication of interest in participation in randomly-selected competition.

BRIEF DESCRIPTION OF THE FIGURES

The foregoing and other objects, aspects, features, and advantages of the present disclosure will become more apparent and better understood by referring to the following description taken in conjunction with the accompanying drawings, in which.

Figure 1:
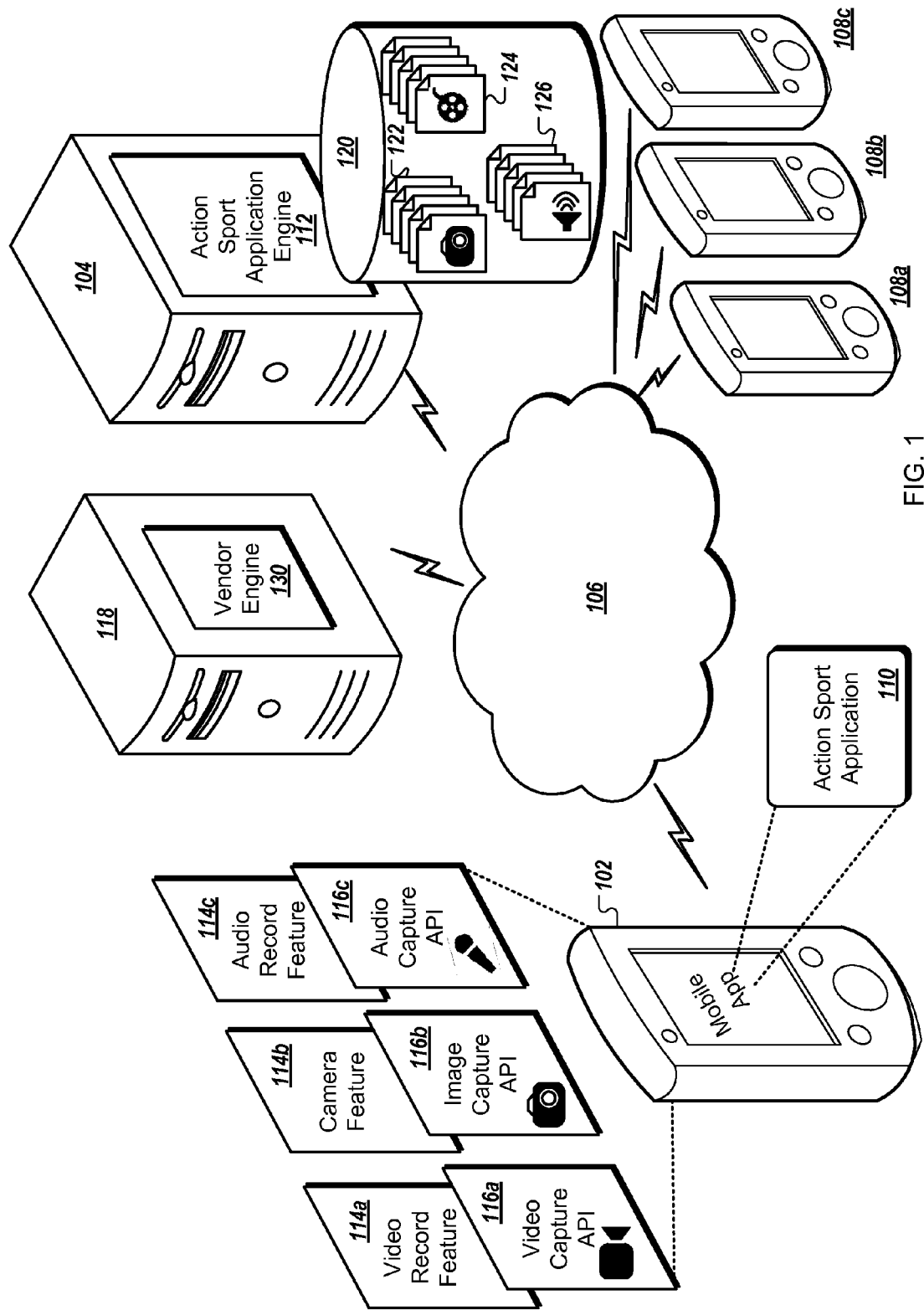
FIG. 1 is a diagram of an exemplary system for fostering an action sport competition.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The methods, systems and apparatus described herein are not limited to the specific devices, methods, applications, conditions or parameters described and/or shown herein. It is to be appreciated that certain features of the methods, systems and structures described herein are described in the context of separate embodiments, and may be provided in any combination or sub-combination of the embodiments described herein. Furthermore, any reference to values stated in ranges includes each and every value within that range.

The present disclosure presents systems and methods and apparatus for an online platform that fosters an action sports competition. Action sports, in some examples, may include skateboarding, snowboarding, skiing, BMX biking, aggressive rollerblading, motorcross, surfing, weightboarding, wakeboarding, waterskiing, basketball stunts, X-games, snowmobiling, billiard tricks, and/or ping-pong. Individual athletes may desire to participate in such an online platform for a particular action sports activity that allows the athletes to upload media documenting their action sport performance. The online platform may enable the user to participate in an online competition against other users of the same sport. Other platform users may judge, rate, rank, comment on, "like", or otherwise promote or demote a particular competitor within the competition. The user feedback may be used to rank the competitors, for example to determine a winner of a head-to-head (or team-to-team) competition or to determine a top rated competitor by category (e.g., age range, skill level, geographic location, sport activity, etc.).

Through the competition-fostering platform, users (e.g., platform members) may search for action sports activities using a number of search criteria and to rate other users' (e.g., competitors) uploaded media clips found in the search results. Such a platform may rank users based on a variety of parameters and award prizes to users for their activity. The platform may also provide vendors and other sponsors a medium by which they can provide users with awards, sponsor competitions, and promote their own organization.

Illustrated in FIG. 1 is a diagram of an exemplary system 100 that provides a platform to foster such an action sport competition. A mobile computing device 102 may be in communication with a server 104 via a network 106 for sending and receiving action sport platform information via an action sport application 110 executing upon the mobile computing device 102. The action sport application 110 enables a user to provide action sport related video recordings to the server 104 and to review video recordings uploaded to the server 104 by other members of the action sport competition-fostering platform. Additionally, members are provided the opportunity to rate, rank, comment on, "like", promote, or otherwise provide feedback related to action sport activities video-recorded by other members of the action sport competition-fostering platform. For example, member mobile devices 108a, 108b, and 108c may be in communication with the action sport application engine 112 and (optionally) the action sport application 110 via network 106 to review video recordings and provide feedback.

In some embodiments, action sport application engine 112 executing upon the server 104 performs the backend processes required by action sport application 110. Action sport application 110 executed on mobile computing device 102 may send data to and receive data from action sport application engine 112 on server 104. In some embodiments, backend processes required by action sports application 110 are jointly performed by mobile computing device 102 and by action sport application engine 112 on server 104.

In some implementations, the action sport competition-fostering platform includes support for vendor-initiated competition. For example, a vendor (e.g., sponsor, consumer product company, sporting organization, or other entity) may initiate a competition within the action sport competition-fostering platform. The competition, for example, may include prizes or other rewards for a winner. In some implementations, the greater member community is provided the opportunity to provide the feedback used to identify a user of a competition. In other implementations, particular judges are identified for providing feedback related to each competitor of the competition. As illustrated, to manage the competition, a vendor engine 130 (e.g., a software application and/or application portal provided by the action sport competition-fostering platform for vendor competition initiation and management) of a server 118 is in communication with action sport application engine 112 and/or action sport application 110 via network 106.

The user of mobile device 102 may record his action sport activity using one or more peripheral features 114 of the mobile computing device 102. In some examples, the peripheral features 114 may include a video recording feature 114a, a camera feature 114b, and an audio recording feature 114c. The peripheral features 114, in some examples, may refer to one or more built-in input devices (e.g., microphone, complementary metal-oxide-semiconductor (CMOS) active pixel sensor, camera-on-a-chip, etc.), firmware or software installed upon the mobile computing device 102 for managing the functionality of the built-in input devices, and/or one or more applications installed upon the mobile computing device 102 or built into the operating system of the mobile computing device 102 for interfacing with built-in and/or tethered (e.g., via Bluetooth, RFID, USB, or other physical or logical connection) input devices. For example, a video recording feature 114a may include coordination of hardware, software, and/or firmware components to record moving images. Additionally, in some embodiments, the video recording feature 114a may include coordination of hardware, software, and/or firmware components to record an audio track associated with the moving image. In other embodiments, the audio record feature 114c may be invoked for recording the audio track, as well as for recording an audio-only file. In some embodiments, rather than providing a separate video recording feature 114a, the camera feature 114b may include coordination of hardware, software, and/or firmware components to record both moving and still images.

To enable sharing of action sport activity-related media using one of the peripheral features 114, in some embodiments, the action sport application 110 makes a call to one or more peripheral device application programming interfaces (APIs) 116 such as, in some examples, a video capture API 116a, an image capture API 116b, and an audio capture API 116c. In some embodiments, a one-to-one correlation exists between the peripheral device APIs 116 and the peripheral device features 114. For example, the video capture API 116a may provide one or more commands for launching the video recording feature 114a, the image capture API 116b may provide one or more commands for launching the camera feature 114b, and the audio capture API 116c may provide one or more commands for launching the audio record feature 114c. In some embodiments, one or more APIs 116 may exist to access a single peripheral device feature 114. For examples, a moving image capture API (not illustrated) may be used to invoke the video record feature 114a without corresponding audio track, while the video capture API 116a may be used to invoke the video record feature 114a with corresponding audio track. Conversely, in some embodiments, one API 116 may exist to invoke two or more peripheral device features 114. For example, the video capture API 116a may be used to invoke the video record feature 114a to record a moving image portion of a multimedia recording, as well as the audio record feature 114c to record the audio portion of a multimedia recording.

In some embodiments, one or more of the peripheral device APIs 116 may be provided within the action sport application 110. A user may download and install the action sport application 110, for example from an application store available via the network 106. In some embodiments, one or more of the peripheral device APIs 116 may be provided in the operating system of the mobile computing device 102, for example to allow applications to interface with various features of the mobile computing device 102.

Upon obtaining data via one of the peripheral device features 114, the action sport application 110, in some embodiments, may provide an interface for automatic upload of captured data. In some embodiments, an API for automatic upload may format and relay data to a designated upload address, accessible via the network 106. For example, the automatic upload API may automatically adjust a file size of a rich media file and direct the captured data to action sport application engine 112. In some embodiments, the action sport application 110 may interface with an upload API provided by the action sport application server 104.

Action sport application engine 112, in some embodiments, stores the captured data in a media storage device 120. The media storage device 120, in some examples, may include one or more memory devices included within the action sport application server 104 and/or in communication with action sport application server 104. As illustrated, the media storage device 120 includes a set of image files 122, a set of video files 124, and a set of audio files 126. The media storage device 120, in some embodiments, may store information regarding captured data. In some examples, information regarding data captured by the mobile device 102 may include user (member) account information, an identifier associated with the action sport application 110 installed upon the mobile device 102, or device information associated with the mobile device 102, as well as a time stamp, a date, a location (e.g., geolocation data, region information, etc.), and/or an indication of a particular action sport activity. In some embodiments, information regarding captured data may be included within a meta data portion of a rich media file, for example a particular image file 122, a particular video file 124, or a particular audio file 126. In some embodiments, the action sport application server 104 may maintain a database of information regarding stored rich media files 122, 124, 126. For example, a particular member identifier or device/mobile application identifier may be associated with two or more rich media files 122, 124, 126.

In some embodiments, the action sport application server 104 may reformat the captured file into a standard format prior to storage, for example for comparison or storage size purposes. In some examples, a rich media file 122, 124, 126 may be compressed, appended with meta data, or otherwise adjusted prior to storage on the media storage device 120.

In some embodiments, upon success of upload of the captured file, the action sport application server 104 may communicate with one or both of the action sport application 110 and the action sport engine 112. For example, the action sport application server 104 may receive a request from action sport application 110 to find another user to compete against in a head to head competition. The action sport application server 104 may forward such a request to the action sport engine 112. The request, in some examples, may include an age range, skill set range, geographic region, or other limitation specifying demographics of a selected competitor. Upon receiving such a request, in some embodiments, the action sport engine 112 may determine a follow-on request to provide to the action sport application 110. For example, if action sport engine 112 receives a request from the user of mobile device 102, via action sport server 104, to find another competitor for a skateboarding competition, action sport engine 112 may make a follow up request to determine which particular type of skateboarding trick the user of mobile device 102 would like to compete for.

In some embodiments, action sport application engine 112 may query vendor server 118 to obtain sponsors for an action sports competition. A vendor engine 130 of the vender server 118 may be in communication with a number of different organizations that have opted to sponsor competitions and individual performances on the action sports competition platform. The vendor engine provides a communication pathway between various vendors and the action sport application engine 112. Although illustrated as separate servers 118, 104, in other implementations, both the vendor engine 130 and the action sport application engine 112 may be implemented at least in part upon a single computing device or computing system including multiple processors and/or devices (e.g., server farm).

In some embodiments, vendor engine 130 may be a portal through which vendors elect to sponsor particular competitions. Vendor engine 130 may contain processing circuitry that is enabled to search a database of vendors based on the parameters of the competition conducted by action sport application engine 112 and contact one or more sponsors that have opted to participate in the types of competitions that match the parameters of the competition requested by a particular member of the action sport competition fostering platform (e.g., the user of the mobile device 102). Vendor engine 130 may also contain a payment mechanism by which a vendor may be able to contribute a monetary sponsorship payment for the competition. Vendor engine 130 may be configured to seek multiple vendors for each competition based on the amount of sponsorship funds required for a competition or action sport activity as specified by action sport application engine 112 in its request to obtain sponsors for a specific competition or activity.

In some implementations, the Vendor engine 130 allows sponsors to search through the list of competitions that action sport application engine 112 manages. For instance, vendor engine 130 may provide a vendor a vendor interface (e.g., graphical user interface, web portal, web application, mobile device application, etc.) that provides the vendor the opportunity to search for a specific type of competition. Competitions, in some examples, may be indexed by one or a combination of parameters such as location of the competition, amount of money needed to sponsor the competition, average skill level of the competitors, number of competitors, type of action sport activity of the competition, etc.

In some embodiments, a sponsor indicates a reward to be provided to the winner(s) or the highest ranked user(s) of an action sport competition through vendor engine 130. The vendor engine 130 may be configured to communicate directly with the action sport application 110 and provide reward information. In some embodiments, the sponsor may obtain, from a user profile maintained by the action sport application engine 112, user information such as a financial repository (e.g., bank account, online account, electronic wallet account, or other account information) in which to deposit a monetary reward or the home address of a user where a reward can be mailed. For instance, once action sport application engine 112 identifies the winner or the highest ranked users that are to receive a reward, vendor engine 130 queries the user's information from a user database that can be accessed through action sport application engine 112. Upon receiving such user information, the sponsor can transmit the reward to the user using the obtained user information through vendor engine 130.

In some embodiments, additional mobile devices 108a, 108b, and 108c may be in communication with the action sport application engine 112. These additional mobile devices 108 each may also implement the action sport application 110. In some implementations, one or more of the additional mobile devices 108 may access the action sport competition-fostering platform via a web application, social media network, or other avenue for performing functionality similar or identical to that described in relation to the action sport application 110. Action sport application engine 112 may communicate with mobile device 108a, 108b, and 108c to create a network of mobile devices that participate in the action sport competition.

In some embodiments, some of the additional mobile devices 108 may be used to provide feedback related to the media uploaded by mobile device 102. Some of the users associated with user accounts accessed via the additional mobile devices 108 may be selected by action sport application engine 112 to compete against the user of mobile device 102 in a head to head competition.

Users of the additional mobile devices 108 may provide feedback, through the action sport application 110 executed on device 108, regarding the media uploaded by additional members of the action sport competition-fostering platform. For instance, mobile device 108 and 102 may include a user interface including controls such as buttons or an interactive touchscreen configured, upon selection, to provide input to the action sport application running on these mobile devices. Using such a user interface, users of these mobile devices may provide feedback regarding the media of other users. Feedback may include ratings based on a numerical scale or may simply consist of a binary (e.g., thumbs up or thumbs down) rating for the media content. Once the user of a particular media device 108 rates a media content, the rating information for that video is communicated to action sport application server 104 and action sport application engine 112 factors the received rating for the video asset to generate a composite score associated with the media (e.g., video including an action sport performance).

Action sport application engine 112, in some embodiments, ranks users and determines the winner in a head to head competition based on this composite score. For example, action sport application engine 112 updates the score for a particular action sport activity for a user of mobile device 102 based on a rating received from an additional media device 108 and updates the overall rating of the user listed on the user profile of the user of mobile device 102. Action sport application engine 112 may then compare this overall rating or score against that of other users found in the action sport application engine to determine ranks or the winner of a head to head competition. Rankings may be limited to a set of users having similar demographics, such as an age range, a skill level, and/or a specific geographic region. For instance, action sport application engine 112 may create these rankings for users within a specific sporting arena, a specific neighborhood, a specific town, a specific county, a specific state, a specific region of the country, a specific country, and/or a specific continent. Alternatively, the user of mobile device 102 may be ranked globally against all other users of the action sports application worldwide.

Figure 2:
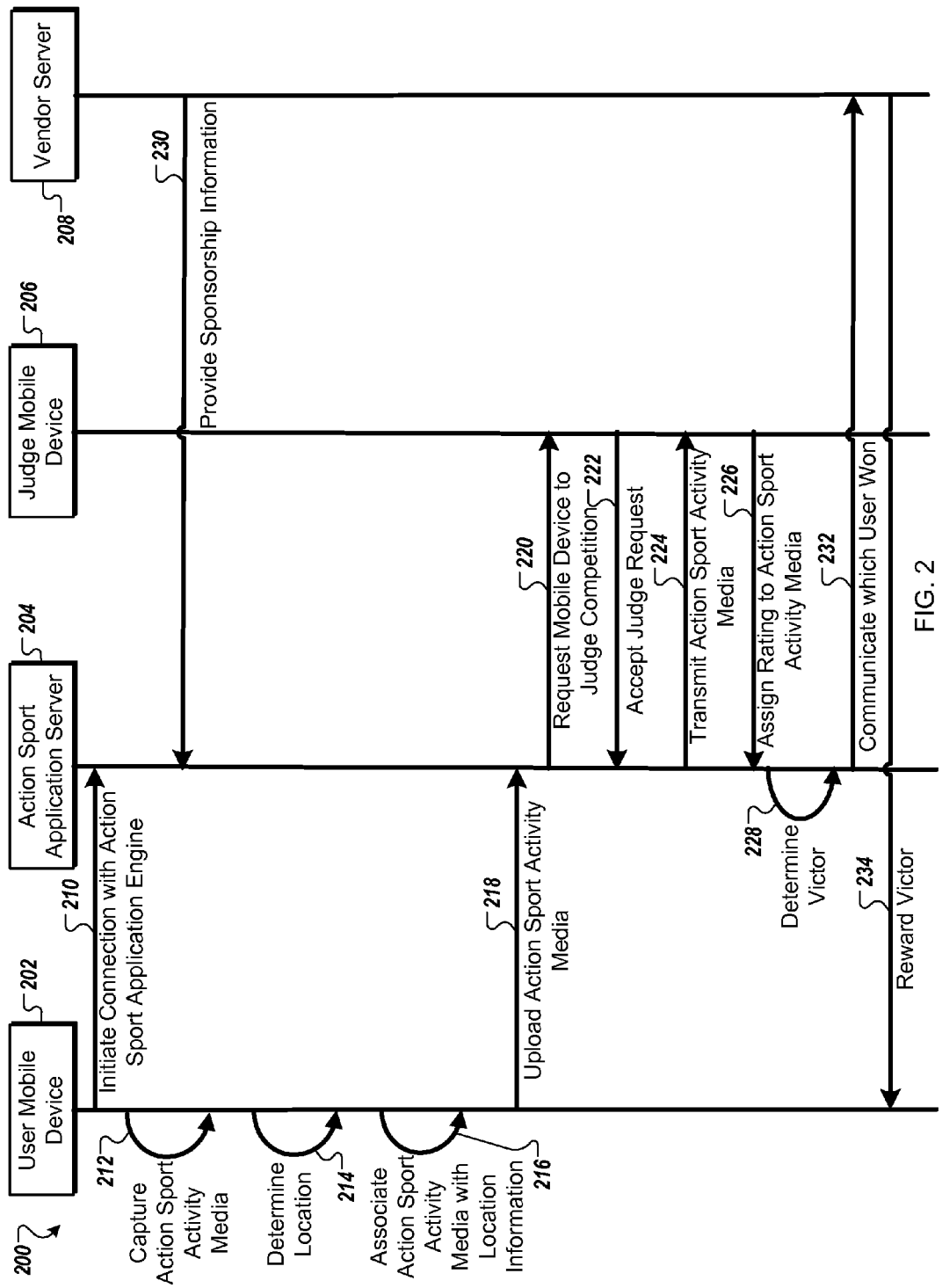
FIG. 2 is a swim diagram illustrating the processes implemented by various components of the exemplary system of FIG. 1 to foster an action sport competition.

FIG. 2 is a swim diagram of an exemplary method 200 for conducting a head-to-head vendor sponsored competition within an action sport competition-fostering platform. The method 200, for example, may be implemented by various components of the system 100 of FIG. 1 to foster an action sport competition. The method 200 involves a user mobile device 202 (e.g., such as mobile device 102 of FIG. 1) in communication with an action sport application server 204 (e.g., such as the server 104 of FIG. 1) and a vendor server 208 (e.g., such as the vendor server 118 of FIG. 1). The action sport application server 204 may organize the action sport competition and communicate with a judge mobile device 206 (e.g., such as an additional device 108 of FIG. 1) as well as vendor server 208 and user mobile device 202 to support the initiation and rating of the head-to-head competition.

In some embodiments, the method 200 begins with user mobile device 202 initiating a connection with an action sport application engine implemented on action sport application server 204 (210). An athlete may launch a mobile action sport application (e.g., such as application 110 described in relation to FIG. 1) on his mobile device 202. Action sport application may connect to the action sport application engine (e.g., such as action sport application engine 112 of FIG. 1) running on action sport application server 204 (e.g., over a network such as network 106 described in relation to FIG. 1). Once such a connection is established, the user can log into his account using a user interface on mobile device 102 to connect to his profile on action sport application engine 112.

In some embodiments, a user captures action sport activity media using user mobile device 202 (212). Once the user logs into his account on the action sport application 110 on his mobile device 102, the user can use the action sport application 110 interface to capture an action sport activity media. Action sport application 110 may make a call to an API to use a peripheral feature 114 of mobile device 102. For example, once the user logs into action sport application 110, he may use the application user interface to capture a performance of his skateboard "kick flip" trick. In response to such a user action, action sport application 110 may make a call to the video capture API 116a to use the video record feature 114a of user mobile device 102. Once the video is recorded, application 110 may store the recorded video in a memory unit of user device 102.

In some embodiments, the user mobile device 202 determines the location where the action sport activity media was captured (214). Action sport application 110 may make a call to a geolocation API to utilize a geolocation feature of the mobile device 102 to determine the location at which the action sport activity was captured. For instance, action sport application may make a call to a global positioning system (GPS) API on the mobile device 102 to determine the GPS coordinates at which the skateboard "kick flip" trick was performed. In another embodiment, action sport application 110 prompts the user to enter the location (e.g., address) at which the trick was performed. The user may enter his location using the user interface of mobile device 102.

In some embodiments, user mobile device 202 associates the captured action sport activity media with location information (216). Once a location has been determined and an action sport activity media has been captured by action sport application 110, action sport application 110 may be configured to tag the captured action sport activity with the location at which the action sport activity was performed. Such tagging allows the captured media to be properly indexed amongst other action sport activities in a database of multiple action sport activities for the purposes of an action sport competition.

In some embodiments, user mobile device 202 uploads the action sport activity media to the action sport application server 204 (218). Action sport application 110, described in relation to FIG. 1, may upload the recorded skateboard "kick flip" video to server 204. Upon successful upload of this video, action sport application 110 may, optionally, remove the captured action sport activity media from the memory unit of device 102 (not illustrated).

At the action sport application server 204, in some embodiments, the uploaded action sport activity media may be indexed and stored in an action sport activity database in action sport application server 204 (not illustrated). Application sport application engine 112, described in relation to FIG. 1, may index the uploaded action sport activity media based on several parameters such as the duration of the uploaded video clip, size of the uploaded action activity media, name of the athlete performing the action sport activity, skill rating of the athlete performing the action sport activity, location at which the action sport activity was performed, etc.

In some embodiments, the action sport application server 204 (e.g., action sport application engine 112) creates a competition for a particular action sport and allows action sport applications 110 on several additional user devices to participate in such a competition (not illustrated).

Once user devices upload action sport activity media submissions to participate in such a competition, action sport application engine 112, in some implementations, pair users against each other. Such a pairing may be implemented based using a pairing algorithm that takes as inputs several parameters such as athlete skill rating, athlete age, athlete location, the action sport activity of the media submission, action sport activity history of the athlete, etc. The determination to pair particular users, for example, may be based in part upon whether a competition request was submitted in relation to the captured action sport activity media.

In some embodiments, action sport application server 204 identifies a judge to judge a competition (not illustrated). A judge device may be selected by using a judge selection algorithm that takes as inputs several parameters such as athlete skill rating of the judge, experience of the user in judging competitions, action sport experience of the user, user location, etc. The judge selection algorithm may also take as input the action sport activity a user has indicated they wish to judge and the competition a user has indicated they wish to judge. In some implementations, members of a particular ranking and/or seniority are considered for judge selection. For example, a potential judge may be identified based in part on one or more of a total number of media uploads, a ranking in the particular action sport, a ranking in the action sport in a particular geographic region, a threshold amount of feedback provided to other members of the action sport competition community, and/or a threshold positive feedback provided by other members of the action sport competition community for the potential judge.

In some embodiments, once a judge has been selected, the action sport application server 204 sends the selected judge mobile device 206 a request to judge the competition (220). For example, the action sport application engine 112 of FIG. 1 may contact a member of the particular action sport competition community (e.g., skateboarding community) to judge a competition.

In some embodiments, the user of the judge mobile device 206 accepts the judge request received from action sport application server 204 via the judge mobile device 206, causing transmission of an acceptance message to the action sport application server 204 (222). The action sport application 110 of FIG. 1 (e.g., implemented on judge mobile device 206), for example, may provide a user with a notification that he or she has been selected to judge a competition. The user of the judge mobile device 206 can accept or deny such a request using the user interface of the action sport application 110 presented by the judge mobile device 206.

In some embodiments, action sport application server 204 transmits one or more action sport activity media files to judge mobile device 206 responsive to the acceptance of the judge request from judge mobile device 206 (224). Action sport application server 204 may transmit or stream an action sport activity media file, (e.g., over network 106 of FIG. 1), to the judge mobile device 206 that the user of judge mobile device 206 has been selected to judge. In some embodiments, action sport application server 204 transmits action sport activity media files of all competitors to judge mobile device 206. The user of the judge mobile device 206 can view all the action sport activity media files and assign a rating to each of the media files. The user may also select a victor upon viewing all of the media files.

In some embodiments, the user of the judge mobile device 206 assigns a rating to the action sport activity media and transmits the rating to action sport application server 204 (226). The user of judge mobile device 206 may assign a rating to each received action sport activity media file using the user interface of judge mobile device 206. The rating, in some examples, may be a numerical rating or a thumbs up or thumbs down rating. The rating may also be an indication of who the judge thinks the victor is or an assigned rank of each of the competitors for a given competition.

In some embodiments, the action sport application server 204 determines the victor of the competition (228). If the action sport application server 204 selected multiple judges to judge a competition, for example, a scoring algorithm may be applied to the ratings received from the various judges by the action sport application server 204 to determine the victor. The action sport application server 204 may accept several parameters such as ratings of the activity captured within each of the action sport activity media files as submitted by each of the selected judges for that competition, the athlete skill rating of each respective judge, the experience of each respective judge in judging competitions, and/or action sport experience of each respective judge, as inputs to the scoring algorithm. The scoring algorithm may weigh these parameters to determine the victor of a competition.

In other embodiments, rather than providing each media file to the judge mobile device 206, the action sport application server 204 enables the judge mobile device 206 to browse the competitors' action sport activity media submissions in an action sport activity database (e.g., located in action sport application server 204 or in communication with the action sport application server 204) and rate such media submissions.

In some embodiments, a vendor server 208 provides sponsorship information to the action sport application server (230). The vendor server (e.g., such as the vendor server 118 of FIG. 1) may identify sponsors that would like to sponsor a competition and may connect sponsors with competitions organized by action sport application server 204. Sponsors may provide vendor server 208 with an indication of the sponsorship that they would like to provide for a particular competition or for a particular type of competition. Vendor server 208 may compile a list of sponsors for each competition and provide that sponsorship information to action sport application server 204 over a network such as the network 106 of FIG. 1. For instance, vendor server 208 may transmit, to action sport application server 204, the advertisements that a particular sponsor would like to display in the action sport application 110 to all users of the application 110 for a particular competition. Vendor server 208 may also transmit reward information (e.g., monetary contribution, product information, etc.) that sponsors provide for the competition to action sport application server 204. The vendor server 208 may provide this information at any time prior to the judging stage of the competition.

In some embodiments, action sport application server 204 communicates the identity of the victor selected by the judges (e.g., as determined by a scoring algorithm of the action sport application server 204) to vendor server 208 (232). For example, once the action sport application engine 112 of FIG. 1 has determined which competitor has won a competition, the action sport application server 104 communicates the identity of the victor to vendor server 118 over network 106.

In some embodiments, the vendor server 208 provides the user of the user mobile device 202 of the identified victor of the action sport competition with an indication of a reward (234). For example, the vendor engine 130 of FIG. 1 may compile a monetary reward from one or multiple sponsors to award the identified victor of a competition.

In some embodiments, sponsors provide victors with a physical reward such as merchandise. In these situations, vendor server 208 may query the action sport application server 204 for the mailing address of the victor. Upon receiving this information, vendor server 208 forwards the mailing address of the victor to the sponsor in order for the sponsor to directly provide the physical reward to the victor.

Figure 3A:
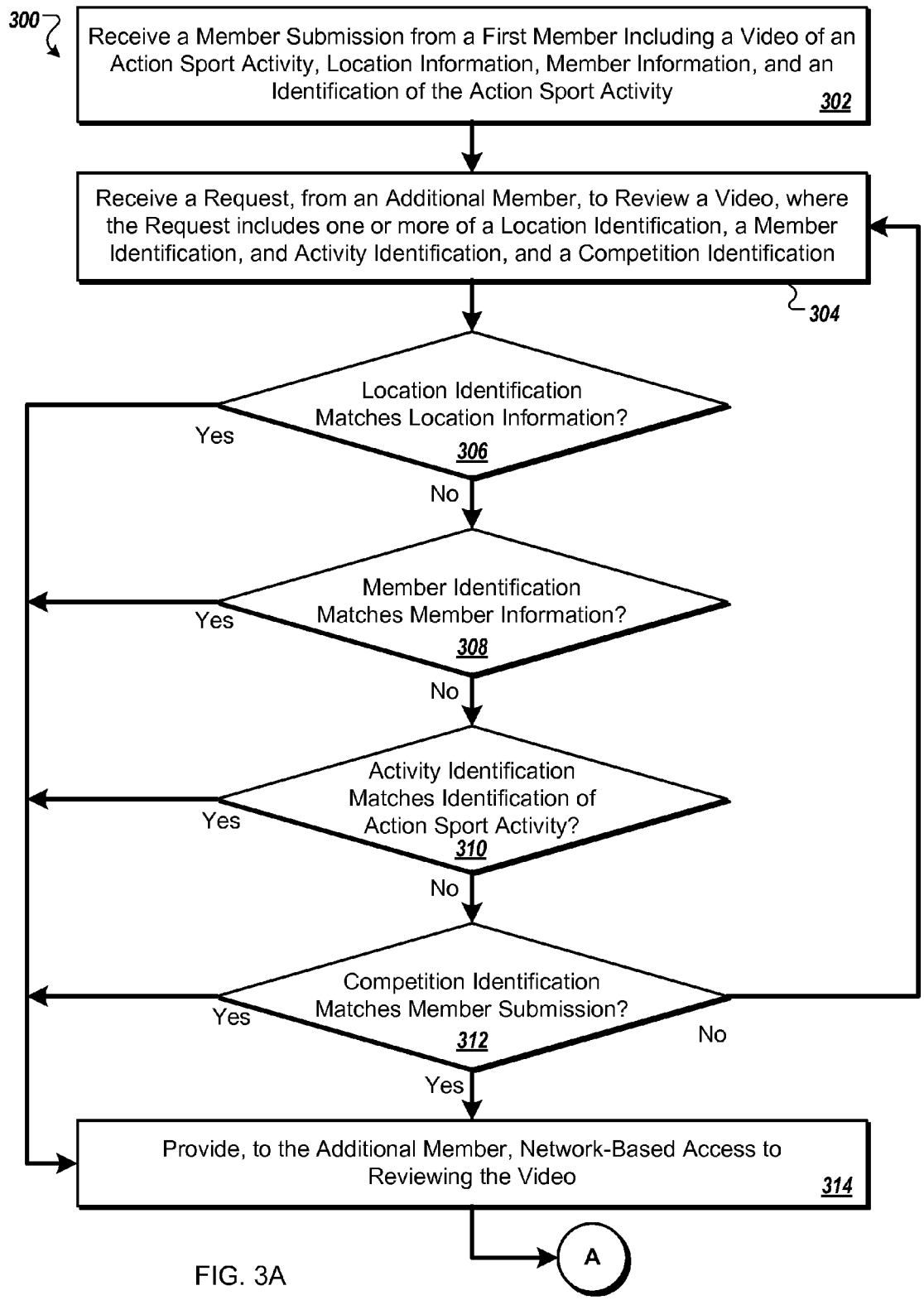
FIGS. 3A and 3B illustrate a flow diagram of an exemplary method for fostering the action sport competition.
Figure 3B:
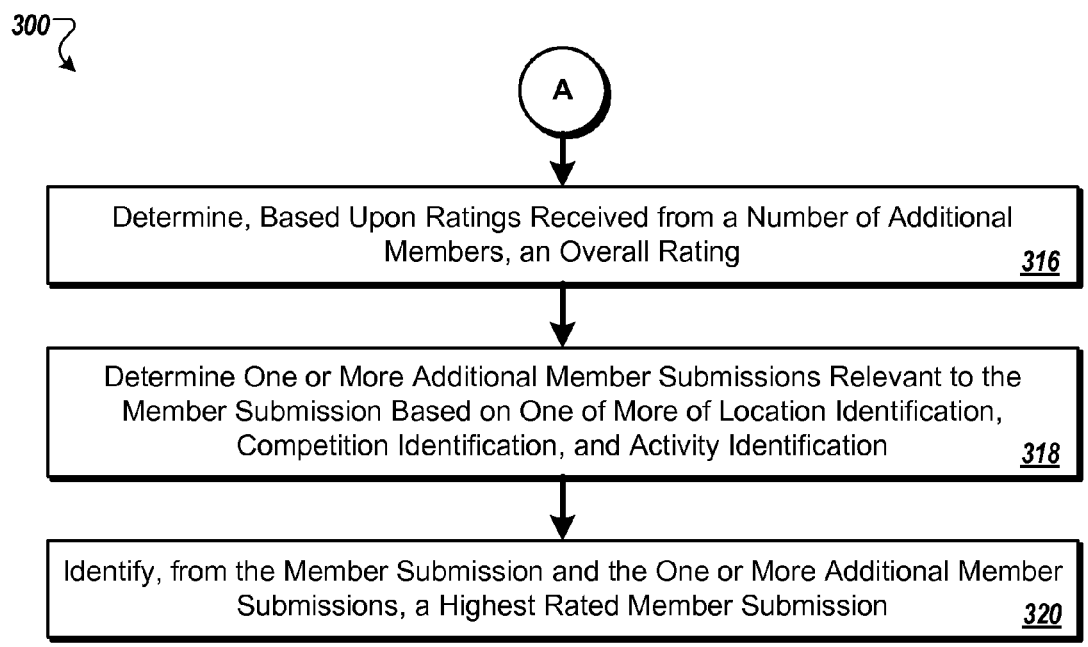

FIGS. 3A and 3B illustrate a flow diagram of an exemplary method 300 for fostering action sport competition. The method 300, in some embodiments, is performed by a server such as the action sport application server 104 described in relation to FIG. 1. The method 300, in some embodiments, is performed by an action sport application engine such as the action sport application engine 112 described in relation to FIG. 1.

In some embodiments, the method 300 begins with receiving a member submission from a first member including a video of an action sport activity, location information, member information, and an Identification of the action sport activity (302). For example, the action sport application server 104 receives a video of a "kick flip" skateboard trick, information about the location at which the "kick flip" trick was performed, the identity of the skateboard user of application 110 on mobile device 102, and an identification of the skateboard trick from mobile device 102 over network 106.

In some embodiments, action sport application server 104 receives a request from an additional member to review a video (304). The request may include one or more of a location identification, member identification, activity identification, and competition identification. For instance, a judge mobile device such as any of devices 108a, 108b, and 108c of FIG. 1 may request to review an action sport activity media file. The request received from such additional members of the action sport application platform may include the location of the additional member, or a location preference for media files that they would like to review. The request may also identify which user's media files the additional member would like to review. The request may identify which action sport activity the additional member would like to review media files for. The request may also identify the competition that the additional member would like to monitor or judge.

In some embodiments, if the request included a location identification, it is determined whether the location identification of the additional member matches the location information received from the first member (306). For example, action sport application server 104 determines whether the skateboarder and the additional member being considered to review the skateboarder's video are both located in the same geographic region. If action sport application server 104 determines that the skateboarder and the additional member being considered to review the skateboarder's video are located in the same geographic region, network based access to review the video is provided to the additional member (314). However, if the request did not include location information, the method 300 proceeds to make other determinations about the first and the additional member.

In some embodiments, if the request included a member identification, it is determined whether the member identification of the additional member matches the member information received from the first member (308). For example, action sport application server 104 determines whether the skateboarder whose video is being considered for review is the same person as the user who the additional member has requested to review. If action sport application server 104 determines that the skateboarder whose video is being considered for review is the same person as the user who the additional member has requested to review, network based access to review the video is provided to the additional member (314). However, if the request did not include member identification information, the method 300 proceeds to make other determinations about the first and the additional member.

In some embodiments, if the request included an activity identification, it is determined whether the activity identification of the additional member matches identification of the action sport activity received from the first member (310). For example, action sport application server 104 determines whether the video being considered for review is a video of the same action sport activity (skateboard "flip kick" trick) that the additional member has requested to review. If action sport application server 104 determines that the video being considered for review is a video of the same action sport activity (skateboard "flip kick" trick) that the additional member has requested to review, network based access to review the video is provided to the additional member (314). However, if the request did not include an activity identification, the method 300 proceeds to make other determinations about the first and the additional member.

In some embodiments, it is determined whether the competition identification of the additional member matches the competition of the first member submission (312). For example, action sport application server 104 determines whether the video being considered for review is a video submitted for the same competition that the additional member has requested to review. If action sport application server 104 determines that the video being considered for review is a video submitted for the same competition that the additional member has requested to review, network based access to review the video is provided to the additional member (314). However, if the request does not include a competition identification or the action sport application server 104 determines that the video being considered for review is not a video submitted for the same competition that the additional member has requested to review, then the method 300 returns to waiting to receive another request from the same or an additional member (304) that would allow for a pairing between a first member submission and the reviewer.

In some embodiments, an overall rating for an action sport activity member submission media file is determined based upon the ratings received from a number of additional members (316). For example, action sport application server 104 may receive ratings for the same member video submission from multiple reviewers. Once action sport application server 104 has received all of the reviewer's ratings, action sport application server 104 may calculate an overall rating for action sport activity member submission media file using a scoring algorithm. The action sport application engine 112 may take several parameters such as the athlete skill rating of the reviewer, the experience of the user in reviewing media submissions, action sport experience of the reviewer, as inputs to a scoring algorithm.

In some embodiments, one or more additional member submissions that are relevant to the member submission are determined based on one or more of location identification, competition identification, and activity identification (318). For example, action sport application server 104 may compare the first member submission against other members submissions. The action sport application server 104 may have already performed at least a portion of the steps 302, 304, 306, 308, 310, 312, 314, and 316 to rate additional member submissions.

In some embodiments, a highest rated member submission from the member submission and the one or more additional member submissions is determined (320). For example, action sport application server 104 may compare the overall ratings for the member submissions and rank them member submissions by overall ratings. Action sport application server 104 may store the rankings in the profile of the members submitting the member submissions.

Although described in relation to a particular series of steps, in some implementations, the method 300 may include more or fewer steps. In some implementations, one or more of the steps of the method 300 may be arranged in a different order. Other modifications of the method 300 are possible without deviating from the concepts and scope of the method 300.

Figure 4:
FIG. 4 is a screenshot of a media upload and search interface of an action sport competition software application.

FIG. 4 is a screenshot of a media upload and search interface 400 of an action sport application 110. The media upload and search interface may be displayed on the display screen of a mobile computing device 102 of FIG. 1. Interface 400 includes a search button 412 which allows the user of the action sport application 110 to search for action sport videos using a variety of search parameters. Interface 400 includes an upload button 414 which allows the user of the action sport application 110 to upload a captured media file documenting the user's action sport activity. Interface 400 includes also displays videos (or thumbnail images therefrom) such as video 402 of previously uploaded media clips of an action sport activity. The user can select video 402 for playback (e.g., using the user interface of mobile computing device 102 as described in relation to FIG. 1). Associated with each video is a description of action sport activity identifier information 404. Information 404 includes the username of the member who has submitted video 402, the name of the action sport activity ("360 Flip 9 Stair") and the location at which the action sport activity was performed ("venice skatepark"). In addition, interface 400 also displays the number of times each video has been viewed, any comments that other users have written for video 402, and the rating of video 402 (i.e., 34 crowns).

Figure 5:
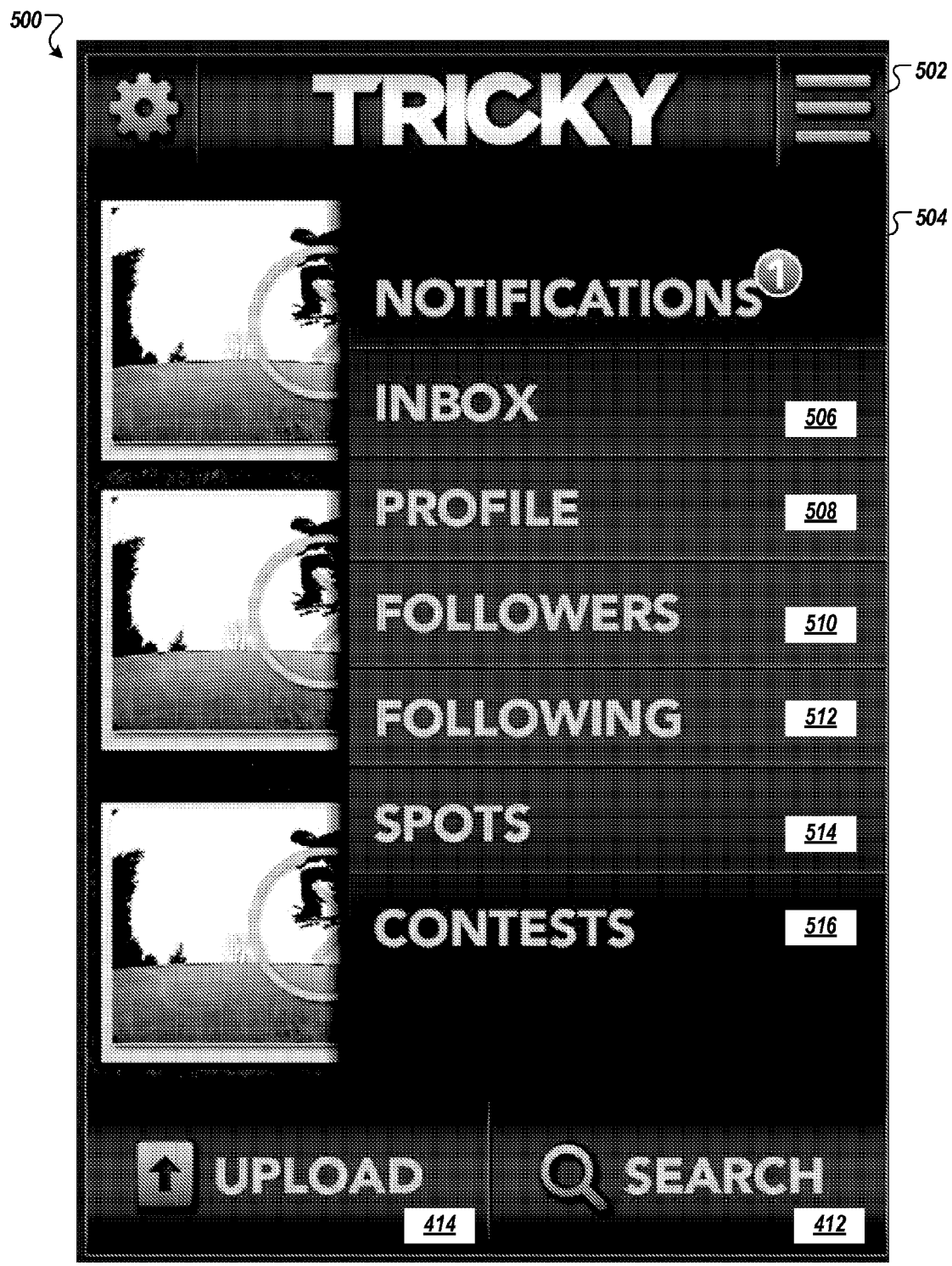
FIG. 5 is a screenshot of a control panel of an action sport competition software application.

FIG. 5 is a screenshot of a control panel 500 of the action sport application 110 as described in relation to FIG. 1. The control panel dashboard may be accessed from the screen displayed in FIG. 4 by selecting button 502. Control panel 500 includes a notification icon 504 that indicates if there are any notifications for the user of the mobile device. Control panel 500 includes an inbox control 506 that when selected, displays an electronic mail inbox for the user of the mobile device. Control panel 500 includes a profile control 508 that when selected displays a profile page for the user of the mobile device. Control panel 500 includes a "followers" control 510 that when selected displays a list of people following the activity of the user of the mobile device. Control panel 500 includes a "following" control 510 that when selected displays list of users whose activity the user of the mobile device is following. Control panel 500 includes a "spots" control 514 that when selected displays a geolocation interface described with relation to FIG. 7 below. Control panel 500 includes a "contests" control 516 that when selected allows the user of the mobile device to view a list of action sport competitions.

Figure 6:
FIG. 6 is a screenshot of a user profile page of an action sport competition software application.

FIG. 6 is a screenshot of a user profile page 600 of an action sport application 110 as described in relation to FIG. 1. The user profile page 600 includes a graphic 610 of the user featured in the profile page. The user profile page 600 includes the username 602 of the user as well as the first and last name and location of the user. The user profile page 600 includes an information section 606 that includes a biography of the user. In addition, the user profile page 600 also includes an indication of how many people are following the activity of the user of featured on the profile page 600, how many action sports application users' activities the user featured on the profile page 600 is following, the number of locations where the user has performed action sports activities, the number of times the user has been awarded the victor of a competition, and the number of video clips that the user has uploaded. The user profile page 600 also includes a "follow" control 604, when selected, allows a user to follow the user featured in the profile page. The profile page 600 includes thumbnail icons 608 of video clips that the user of profile page 600 has uploaded. When selected, the thumbnail icon 608 plays back the video corresponding to the selected thumbnail icon.

Figure 7:
FIG. 7 is a screenshot of a geolocation interface of an action sport competition software application.

FIG. 7 is a screenshot of a geolocation interface 700 of an action sport application 110 as described in relation to FIG. 1. The geolocation interface 700 displays a map 702. The map 702 includes hotspots indicators such as spot indicator 704 where other users may be performing action sports activities. When a spot indicator, such as spot indicator 704, is selected by the user of the mobile device, a label 710 describing the location marked by the selected spot indicator is displayed as an overlay over map 702.

Geolocation interface 700 includes a hotspot finder control 708. When hotspot finder control 708 is selected by the user of the mobile device, map 702 may be populated with hotspot indicators in the region of the map displayed on geolocation interface 700. Geolocation interface 700 includes a current location control 706. When current location control 706 is selected by the user of mobile device 102, a current location indicator 712 marking the current location of the mobile device is overlaid on map 702.

Figure 8:
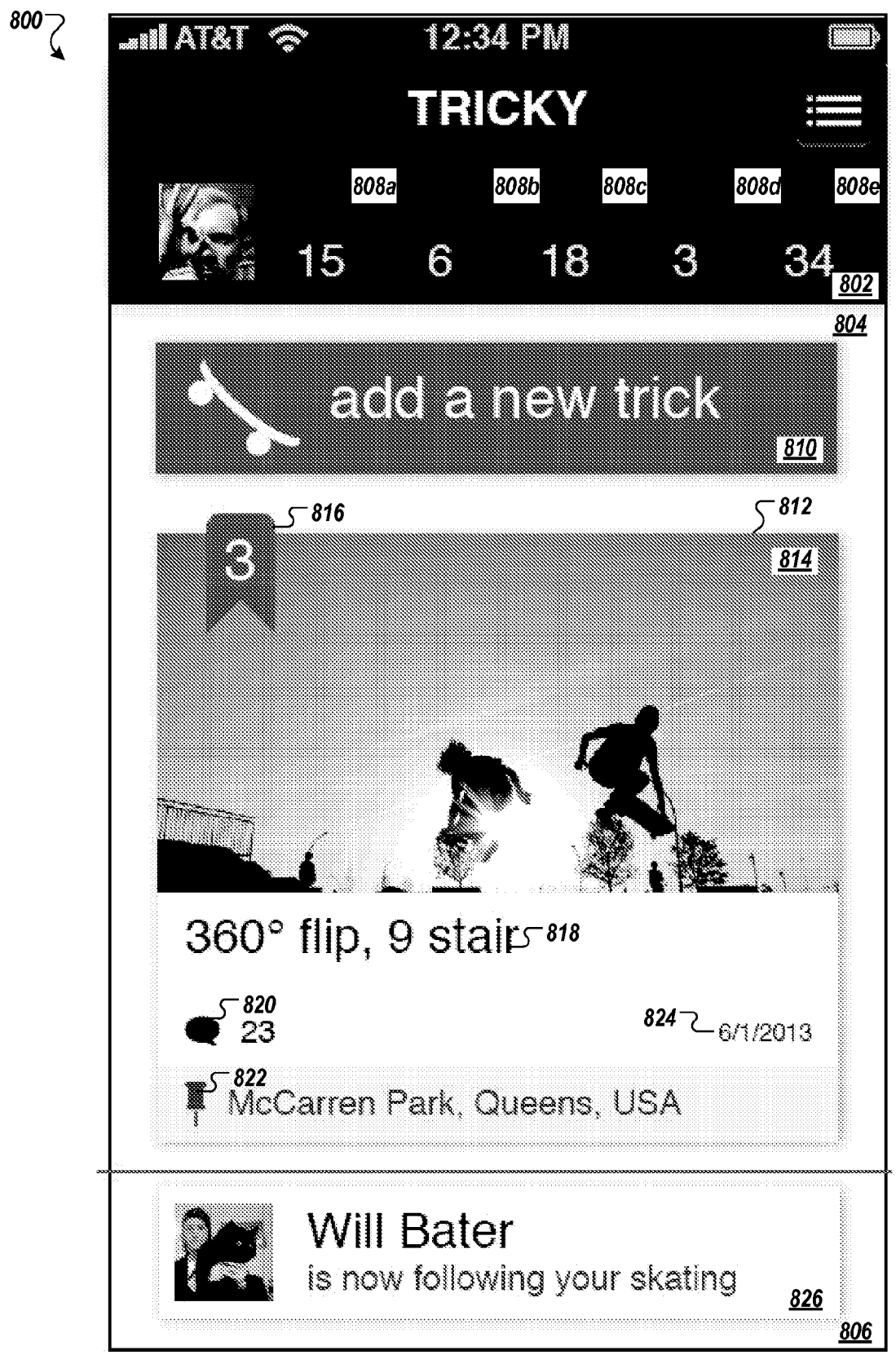
FIG. 8 is a screenshot of a news feed interface of an action sport competition software application.

FIG. 8 is a screenshot of a news feed interface 800 of an action sport competition software application, such as the action sport application 110 as described in relation to FIG. 1. In some implementations, the news feed interface 800 is presented to a user upon accessing the action sport competition software application (e.g., logging in with credentials such as user name and password). The news feed interface 800 includes a profile synopsis bar 802, an upload region 804, and a notifications region 806.

Turning to the profile synopsis bar 802, the present user is presented with a series of controls 808, including a clips control 808a with an indication of number of clips uploaded by the present user (e.g., 15), a competitions control 808b with an indication of number (e.g., 6) of competitions the present user has been involved in (e.g., won, placed, participated, currently active in, etc.), a spots control 808c with an indication of a number of spots (e.g., 18) related to the user (e.g., spots where the user competed, judged, uploaded a clip corresponding to, etc.), a followers control 808d indicating a number of users following the activities of the present user (e.g., 3), and a following control 808e indicating a number of users the present user is following (e.g., 808e).

Beneath the profile synopsis bar 802, the upload region 804 includes a trick synopsis pane 812 providing details of a member submission of an action sport activity (e.g., skateboarding trick) uploaded by the present user and an "add a new trick" control 810 for upload of a new member submission (e.g., similar to upload button 414 described in relation to FIG. 4). The trick synopsis pane 812, for example, includes an image 814 (e.g., still image, animated image, video image, etc.) of the action sport activity, a win indication 816 of the action sport activity (e.g., number of wins in various competitions, ranking within a competition, or ranking/"win" in view of member feedback related to the submission), a description 818 of the action sport activity (e.g., name of the trick), a comments control 820 configured, upon selection, to present member comments submitted in relation to the action sport activity, a location indication 822 listing the spot at which the media file of the action sport activity was captured, and a date indication 824 indicating the date of the submission (e.g., date of media file capture and/or date of media file upload). The action sport activity identified within the trick synopsis pane 812, in some examples, may be the most recent submission by the present user, a submission presently involved in a competition, the most popular submission by the present user, and/or the most recently commented on submission by the present user. In other implementations, additional trick synopsis panes may be presented to the user (e.g., by scrolling through the interface 800) including a number of submissions presented by the user.

Beneath the trick synopsis pane 812, the notifications region 806 includes a new follower notification 826. Follower Will Bater, identified within the notification region 826, for example, may be included in the number of followers identified in relation to the followers control 808d above.

Figure 9:
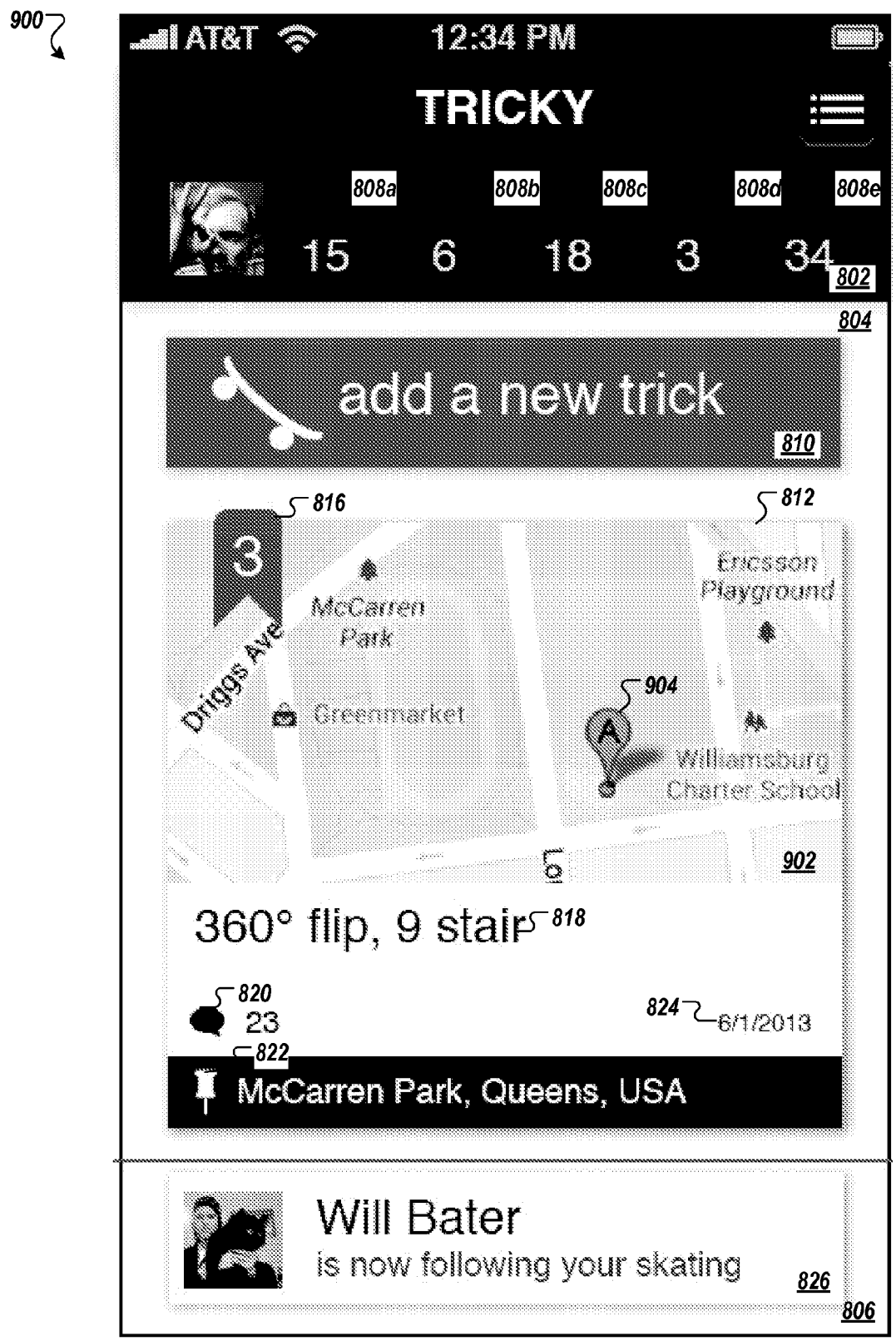
FIG. 9 is a screenshot of another news feed interface including location pin controls.

FIG. 9 is a screenshot of the news feed interface 900 including location pin controls. The news feed interface 900, for example, may be presented upon selection of the location indication 822 described in relation to FIG. 8. The news feed interface 900 presents a map 902 in the place of the image 814 of FIG. 8. The map 902 includes a pin 904 identifying the location of the action sport activity (e.g., McCarren Park, Queens, USA). In some implementations, the pin 904 identifies a particular GPS location within McCarren Park, as uploaded, for example, in submission of the action sport activity. In some implementations, upon selection of the pin 904, the user may be presented with a number of additional member submissions associated with substantially the same location (e.g., McCarren Park, within a threshold distance of the particular GPS location, etc.).

Figure 10:
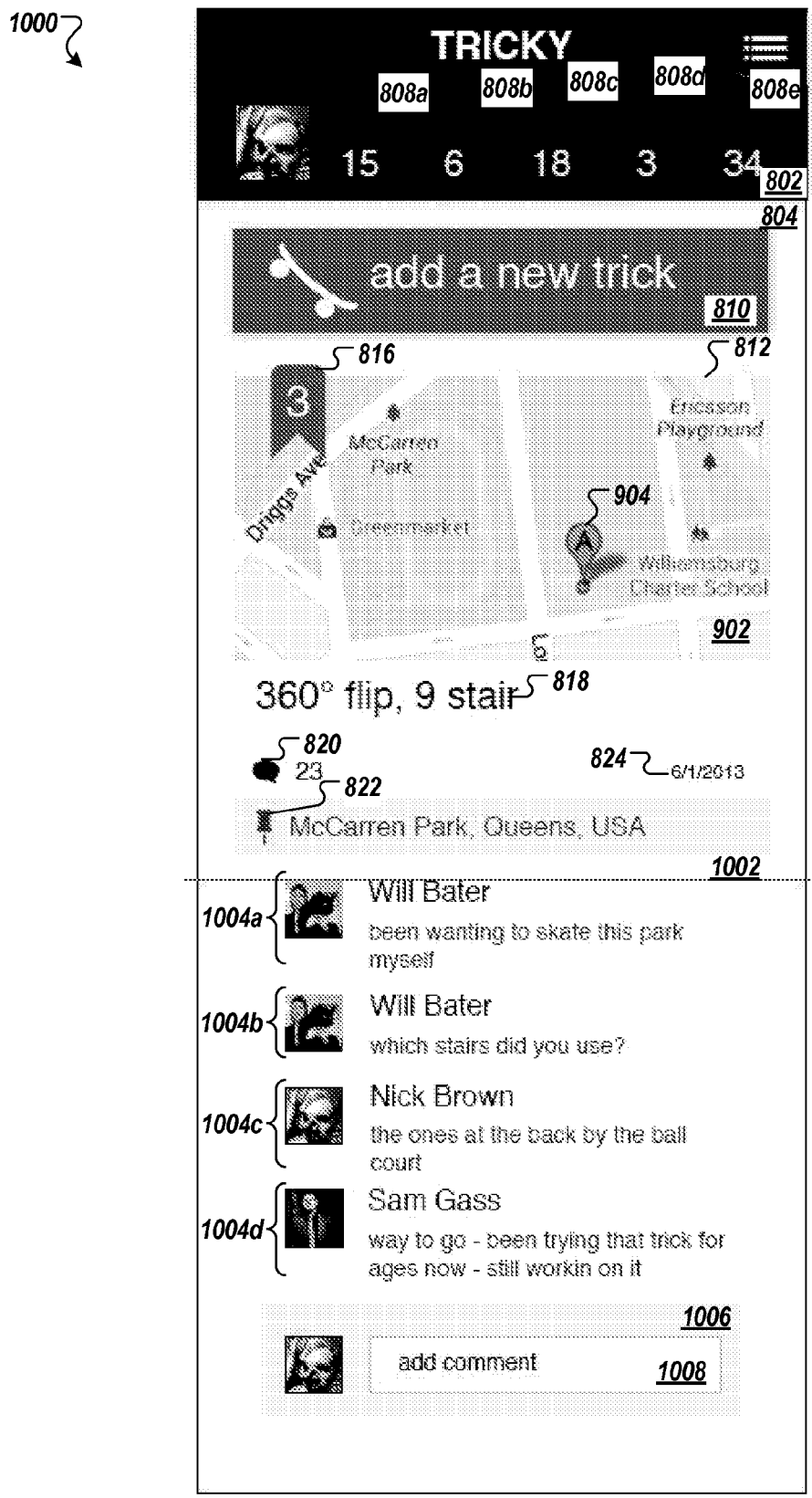
FIG. 10 is a screenshot of a comments interface of an action sport competition software application.

Turning to FIG. 10, a screenshot of a comments interface 1000 of an action sport competition software application, such as the action sport application 110 as described in relation to FIG. 1, is illustrated. The comment interface 1000, for example, may be presented upon selection of the comments control 820, described in relation to FIG. 8, from within the news feed interface 900.

Beneath the trick synopsis pane 812, a comments pane 1002 presents a series of member comments 1004. Additionally, a comment dialogue 1006 includes a comment entry field 1008 for responding to one or more of the member comments.

Figure 11:
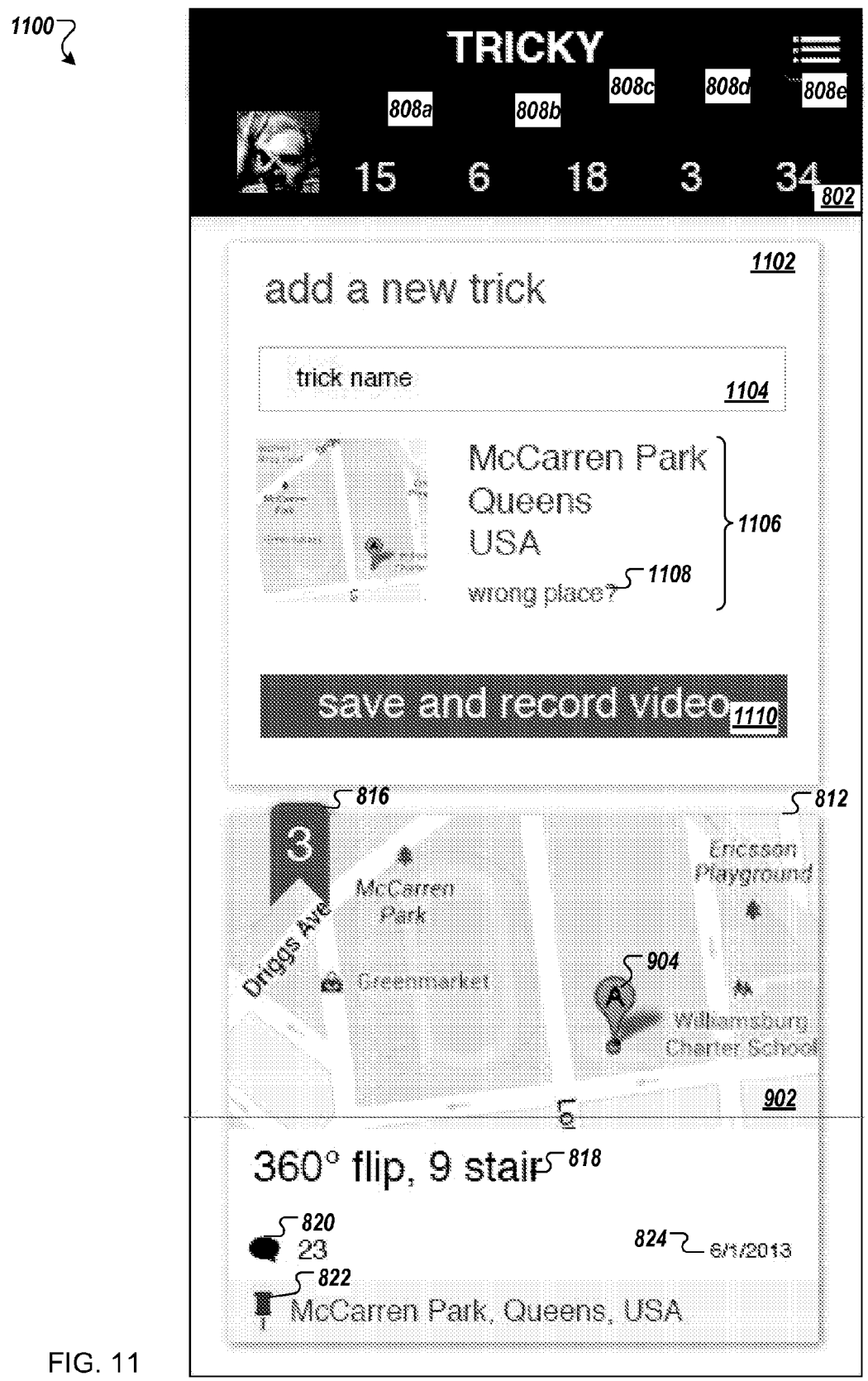
FIG. 11 is a screenshot of an upload interface of an action sport competition software application.

FIG. 11 is a screenshot of an upload interface 1100 of an action sport competition software application, such as the action sport application 110 as described in relation to FIG. 1. The upload interface 1100, for example, may be presented upon selection of the "add a new trick" control 810, described in relation to FIG. 8, from within the news feed interface 900 or the comments interface 1000.

As illustrated, above the trick synopsis pane 812, a member submission pane 1102 presents controls for identifying information related to a new member submission of an action sport activity. For example, a text entry field 1104 is configured to accept a name and/or brief description of the action sport activity. A location interface 1106 presents location information associated with the action sport activity, including an address and a map preview. The location presented within the location interface 1106, for example, may include a default location, such as the location of the mobile device at the time of presentation of the upload interface 1100. In some implementations, the location is automatically identified by querying the mobile device for GPS coordinates. An override control 1108, when selected, may allow the user to modify the location information. For example, if the GPS coordinates failed to identify the location as McCarren Park, the user could enter that information. In another example, if the media file of the action sport activity was captured at a different location (e.g., at an earlier time), the user may enter an entirely different address.

An upload control 1110, upon selection, provides the user with an interface to upload (and, optionally, capture) a media file of an action sport activity. For example, a new interface may include a file browser or thumbnail images of available media files for upload.

Figure 12:
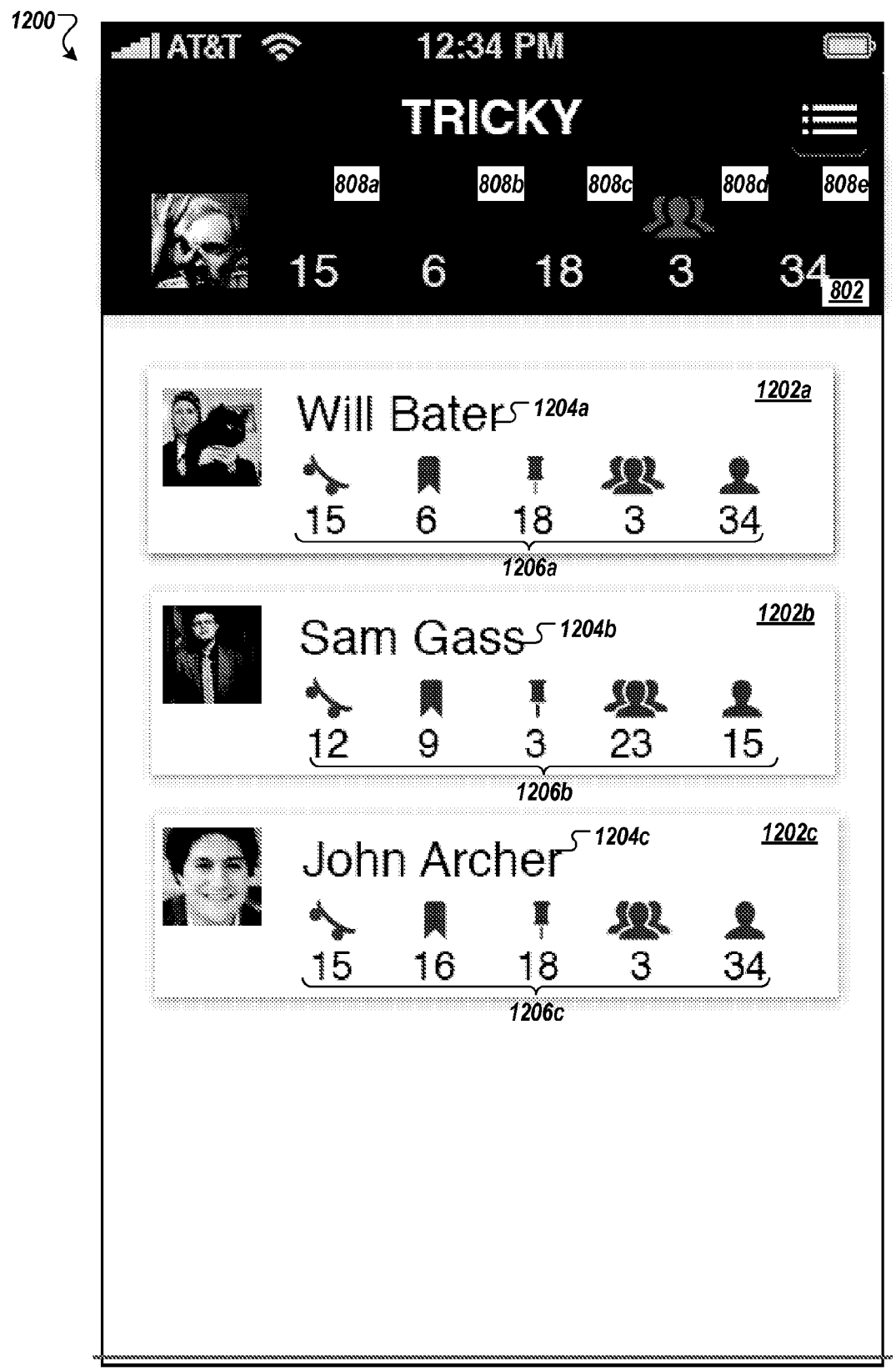
FIG. 12 is a screenshot of a followers interface of an action sport competition software application.

FIG. 12 is a screenshot of a followers interface 1200 of an action sport competition software application, such as the action sport application 110 as described in relation to FIG. 1. The followers interface 1200, for example, may be presented upon selection of the followers control 808d (illustrated as being presented in a different color than the remaining controls 808), described in relation to FIG. 8, from within any of the preceding interfaces 800, 900, 1000, or 1100.

As indicated beneath the followers control 808d, the present user has three followers. Each of the three followers are presented within individual follower synopsis panes 1202. The follower synopsis panes, for example, include an identification 1204a of the follower (e.g., thumbnail image, name) as well as a profile synopsis 1206 including selectable controls related to submissions, competitions, locations, followers, and followings.

Figure 13:
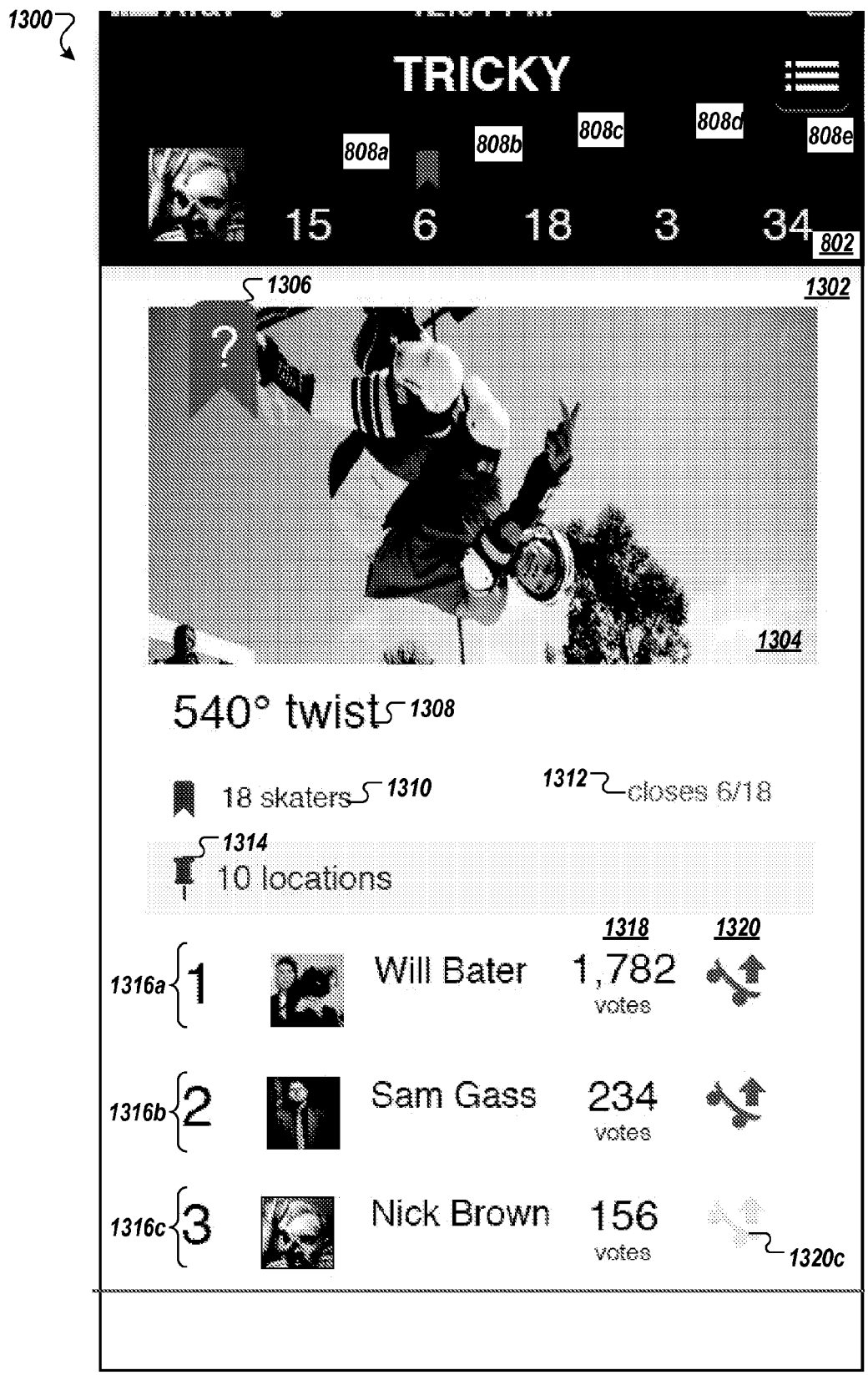
FIG. 13 is a screenshot of a competitions interface of an action sport competition software application.

FIG. 13 is a screenshot of a competitions interface 1300 of an action sport competition software application, such as the action sport application 110 as described in relation to FIG. 1. The competitions interface 1300, for example, may be presented upon selection of the competitions control 808b (illustrated as being presented in a different color than the remaining controls 808), described in relation to FIG. 8, from within any of the preceding interfaces 800, 900, 1000, or 1100.

A competition pane 1302 presents information related to a particular competition, such as a name (or brief description) of an action sport activity 1308, an image 1304 (e.g., sponsor logo, illustration of the action sport activity, etc.), a number of competitors 1310 (e.g., 18), and a deadline 1312 for participation.

Additionally, a locations control 1314, upon selection, presents the user with a number of locations (e.g., 10) where various competitors have captured media files of the action sport activity 1308. The locations, for example, may be presented as a number of pins upon a map interface, such as the map 702 illustrated in FIG. 7.

Beneath the locations control 1314, a series of competitor synopses 1316 identify the competitors 1310 or a portion thereof (e.g., top three). The competitor synopses 1316, in some implementations, are arranged in ranked order (e.g., according to a number of votes column 1318).

In some implementations, the present user is provided the opportunity to vote for one or more competitors 1310. For example, a voting control column 1320 contains controls which, upon selection, allow the present user to vote for a particular competitor. As illustrated, the voting control 1320*c* associated with the present user (e.g., Nick Brown) is illustrated as being not available for selection (e.g., "grayed out"), either because Nick Brown already voted for himself or because a competitor is not allowed to vote for himself.

Figure 14:
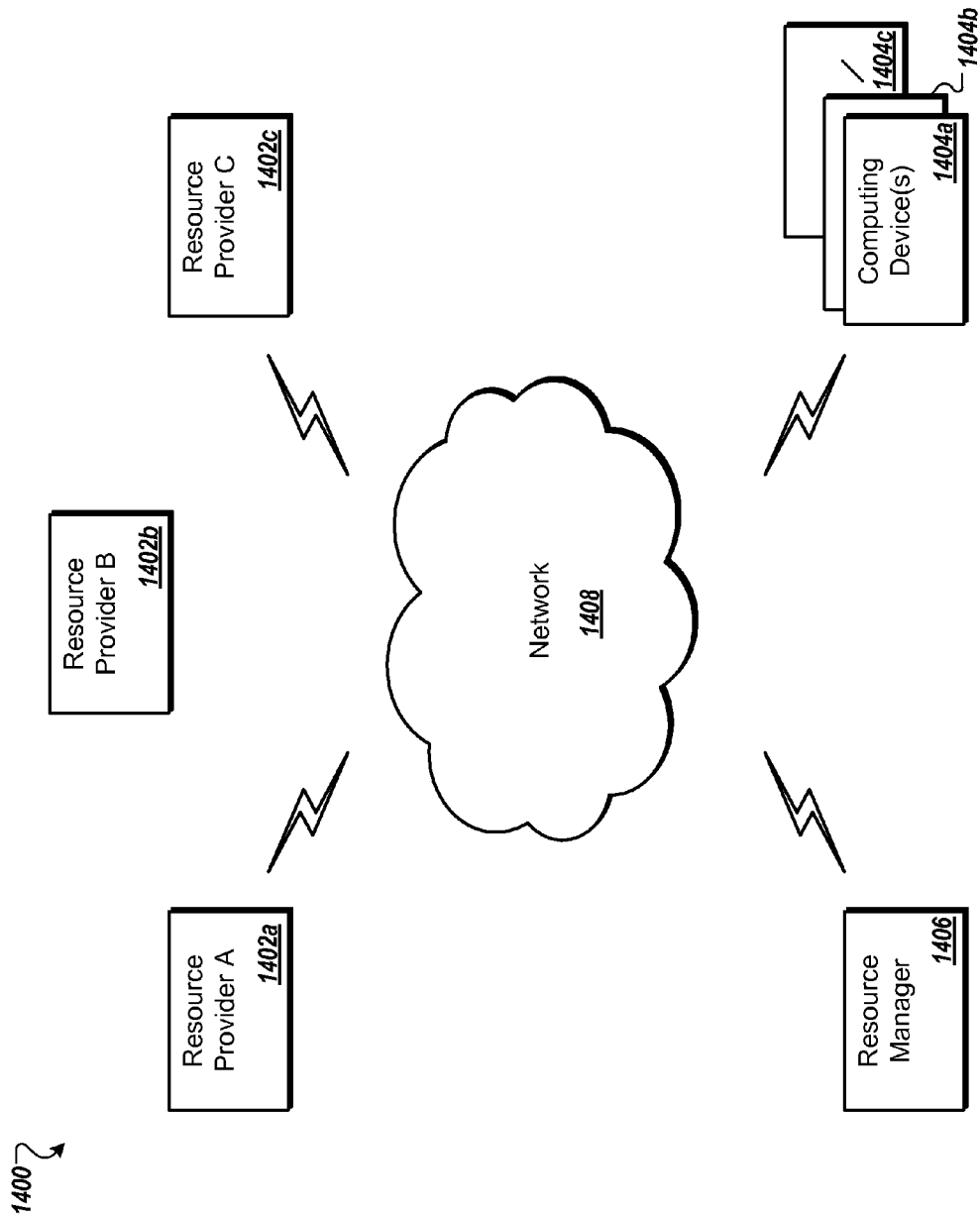
FIG. 14 is a block diagram of an example network environment for implementing an action sport competition-fostering platform.

As shown in FIG. 14, an embodiment of an exemplary cloud computing environment 1400 for fostering action sport competition is provided. The cloud computing environment 1400 may include one or more resource providers 1402*a*, 1402*b*, 1402*c* (collectively, 1402). Each resource provider 1402 may include computing resources. In some embodiments, computing resources include any hardware and/or software used to process data. For example, computing resources may include hardware and/or software capable of executing algorithms, computer programs, and/or computer applications. In some embodiments, exemplary computing resources include application servers and/or databases with storage and retrieval capabilities. Each resource provider 1402 may be connected to any other resource provider 1402 in the cloud computing environment 1400. In some embodiments, the resource providers 1402 are connected over a computer network 1408. Each resource provider 1402 may be connected to one or more computing device 1404*a*, 1404*b*, 1404*c* (collectively, 1404), over the computer network 1408.

The cloud computing environment 1400 may include a resource manager 1406. The resource manager 1406 may be connected to the resource providers 1402 and the computing devices 1404 over the computer network 1408. In some embodiments, the resource manager 1406 facilitates the provision of computing resources by one or more resource providers 1402 to one or more computing devices 1404. The resource manager 1406 may receive a request for a computing resource from a particular computing device 1404. The resource manager 1406 may identify one or more resource providers 1402 capable of providing the computing resource requested by the computing device 1404. The resource manager 1406 may select a resource provider 1402 to provide the computing resource. The resource manager 1406 may facilitate a connection between the resource provider 1402 and a particular computing device 1404. In some embodiments, the resource manager 1406 established a connection between a particular resource provider 1402 and a particular computing device 1404. In some embodiments, the resource manager 1406 redirected a particular computing device 1404 to a particular resource provider 1402 with the requested computing resource.

Figure 15:
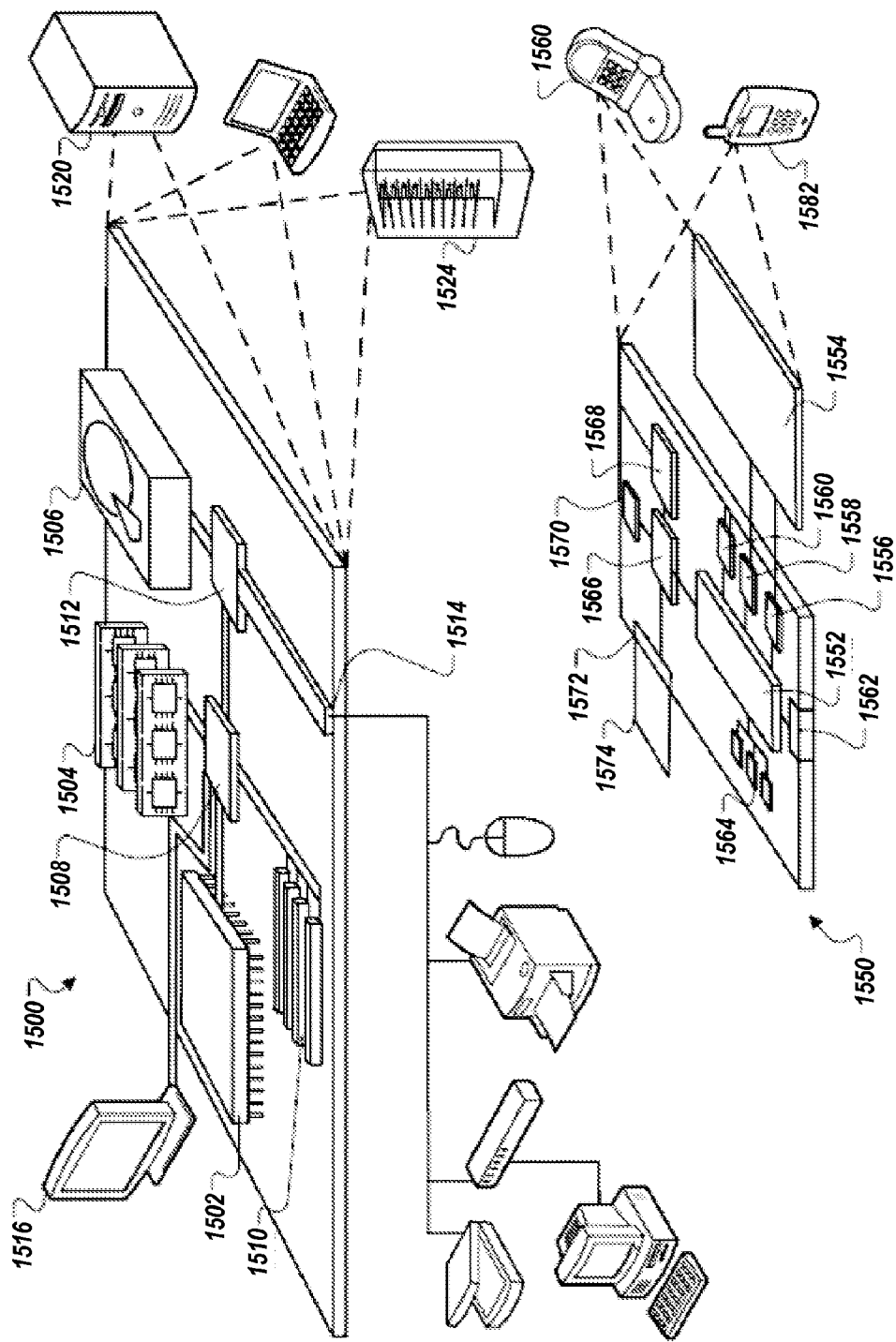
FIG. 15 is a block diagram of a computing device and a mobile computing device.

FIG. 15 shows an example of a computing device 1500 and a mobile computing device 1550 that can be used to implement the techniques described in this disclosure. The computing device 1500 is intended to represent various forms of digital computers, such as laptops, desktops, workstations, personal digital assistants, servers, blade servers, mainframes, and other appropriate computers. The mobile computing device 1550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1500 includes a processor 1502, a memory 1504, a storage device 1506, a high-speed interface 1508 connecting to the memory 1504 and multiple high-speed expansion ports 1510, and a low-speed interface 1512 connecting to a low-speed expansion port 1514 and the storage device 1506. Each of the processor 1502, the memory 1504, the storage device 1506, the high-speed interface 1508, the high-speed expansion ports 1510, and the low-speed interface 1512, are interconnected using various busses, and may be mounted on a common motherboard or in other manners as appropriate. The processor 1502 can process instructions for execution within the computing device 1500, including instructions stored in the memory 1504 or on the storage device 1506 to display graphical information for a GUI on an external input/output device, such as a display 1516 coupled to the high-speed interface 1508. In other embodiments, multiple processors and/or multiple buses are used, as appropriate, along with multiple memories and types of memory. Also, multiple computing devices may be connected, with each device providing portions of the necessary operations (e.g., as a server bank, a group of blade servers, or a multi-processor system).

The memory 1504 stores information within the computing device 1500. In some embodiments, the memory 1504 is a volatile memory unit or units. In some embodiments, the memory 1504 is a non-volatile memory unit or units. The memory 1504 may also be another form of computer-readable medium, such as a magnetic or optical disk.

The storage device 1506 is capable of providing mass storage for the computing device 1500. In some embodiments, the storage device 1506 is or contains a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1502), perform one or more methods, such as those described above. The instructions can also be stored by one or more storage devices such as computer- or machine-readable mediums (for example, the memory 1504, the storage device 1506, or memory on the processor 1502).

The high-speed interface 1508 manages bandwidth-intensive operations for the computing device 1500, while the low-speed interface 1512 manages lower bandwidth-intensive operations. Such allocation of functions is an example only. In some embodiments, the high-speed interface 1508 is coupled to the memory 1504, the display 1516 (e.g., through a graphics processor or accelerator), and to the high-speed expansion ports 1510, which may accept various expansion cards (not shown). In the embodiment, the low-speed interface 1512 is coupled to the storage device 1506 and the low-speed expansion port 1514. The low-speed expansion port 1514, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 1500 may be implemented in a number of different forms, as shown in the figure. For example, it may be implemented as a standard server 1520, or multiple times in a group of such servers. In addition, it may be implemented in a personal computer such as a laptop computer 1522. It may also be implemented as part of a rack server system 1524. Alternatively, components from the computing device 1500 may be combined with other components in a mobile device (not shown), such as a mobile computing device 1550. Each of such devices may contain one or more of the computing device 1500 and the mobile computing device 1550, and an entire system may be made up of multiple computing devices communicating with each other.

The mobile computing device 1550 includes a processor 1552, a memory 1564, an input/output device such as a display 1554, a communication interface 1566, and a transceiver 1568, among other components. The mobile computing device 1550 may also be provided with a storage device, such as a micro-drive or other device, to provide additional storage. Each of the processor 1552, the memory 1564, the display 1554, the communication interface 1566, and the transceiver 1568, are interconnected using various buses, and several of the components may be mounted on a common motherboard or in other manners as appropriate.

The processor 1552 can execute instructions within the mobile computing device 1550, including instructions stored in the memory 1564. The processor 1552 may be implemented as a chipset of chips that include separate and multiple analog and digital processors. The processor 1552 may provide, for example, for coordination of the other components of the mobile computing device 1550, such as control of user interfaces, applications run by the mobile computing device 1550, and wireless communication by the mobile computing device 1550.

The processor 1552 may communicate with a user through a control interface 1558 and a display interface 1556 coupled to the display 1554. The display 1554 may be, for example, a TFT (Thin-Film-Transistor Liquid Crystal Display) display or an OLED (Organic Light Emitting Diode) display, or other appropriate display technology. The display interface 1556 may comprise appropriate circuitry for driving the display 1554 to present graphical and other information to a user. The control interface 1558 may receive commands from a user and convert them for submission to the processor 1552. In addition, an external interface 1562 may provide communication with the processor 1552, so as to enable near area communication of the mobile computing device 1550 with other devices. The external interface 1562 provides, for example, for wired communication in some embodiments, or for wireless communication in other embodiments, and multiple interfaces may also be used.

The memory 1564 stores information within the mobile computing device 1550. The memory 1564 can be implemented as one or more of a computer-readable medium or media, a volatile memory unit or units, or a non-volatile memory unit or units. An expansion memory 1574 may also be provided and connected to the mobile computing device 1550 through an expansion interface 1572, which may include, for example, a SIMM (Single In Line Memory Module) card interface. The expansion memory 1574 may provide extra storage space for the mobile computing device 1550, or may also store applications or other information for the mobile computing device 1550. Specifically, the expansion memory 1574 may include instructions to carry out or supplement the processes described above, and may include secure information also. Thus, for example, the expansion memory 1574 may be provide as a security module for the mobile computing device 1550, and may be programmed with instructions that permit secure use of the mobile computing device 1550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some embodiments, instructions are stored in an information carrier. The instructions, when executed by one or more processing devices (for example, processor 1552), perform one or more methods, such as those described above. The instructions can also be stored by one or more storage devices, such as one or more computer- or machine-readable mediums (for example, the memory 1564, the expansion memory 1574, or memory on the processor 1552). In some embodiments, the instructions can be received in a propagated signal, for example, over the transceiver 1568 or the external interface 1562.

The mobile computing device 1550 may communicate wirelessly through the communication interface 1566, which may include digital signal processing circuitry where necessary. The communication interface 1566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1568 using a radio-frequency. In addition, short-range communication may occur, such as using a Bluetooth®, Wi-Fi™, or other such transceiver (not shown). In addition, a GPS (Global Positioning System) receiver module 1570 may provide additional navigation- and location-related wireless data to the mobile computing device 1550, which may be used as appropriate by applications running on the mobile computing device 1550.

The mobile computing device 1550 may also communicate audibly using an audio codec 1560, which may receive spoken information from a user and convert it to usable digital information. The audio codec 1560 may likewise generate audible sound for a user, such as through a speaker, e.g., in a handset of the mobile computing device 1550. Such sound may include sound from voice telephone calls, may include recorded sound (e.g., voice messages, music files, etc.) and may also include sound generated by applications operating on the mobile computing device 1550.

The mobile computing device 1550 may be implemented in a number of different forms, as shown in the figure. For example, it may be implemented as a cellular telephone 1580. It may also be implemented as part of a smart-phone 1582, personal digital assistant, or other similar mobile device.

Various embodiments of the systems and techniques described here can be realized in digital electronic circuitry, integrated circuitry, specially designed ASICs (application specific integrated circuits), computer hardware, firmware, software, and/or combinations thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an embodiment of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In view of the structure, functions and apparatus of the systems and methods described here, in some embodiments, an environment and methods for fostering action sport competition are provided. Having described certain embodiments of methods and apparatus for supporting action sport competition, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed:

1. A method comprising:
   receiving, over a network from a remote computing device, a member submission comprising a) a video comprising an action sport activity, b) location information identifying a location of video capture, and c) member identifying information;
   providing, to a plurality of members, network-based access to reviewing the video, wherein
      providing the network-based access comprises providing a control configured, upon selection, to submit a rating associated with the video, and
      network-based access is provided based upon one or more of
         i) a location identification, received from a respective member of the plurality of members, identifying a geographic location within a predetermined range of the location of video capture,
         ii) a member identification, received in relation to the member submission, of two or more particular members of the plurality of members,
         iii) an activity identification, received from a respective member of the plurality of members, identifying the action sport activity, and
         iv) a competition identification, received from a respective member of the plurality of members, wherein the member submission was submitted in relation to a competition identified by the competition identification;
   receiving, from at least a subset of the plurality of members, responsive to providing access to reviewing the video, a respective rating;
   determining, by a processor of a computing device, based upon a plurality of ratings received from the subset of the plurality of members, an overall rating;
   accessing, by the processor, one or more additional member submissions, wherein the one or more additional member submissions share at least one of the location of video capture, the competition identification, and the activity identification; and
   identifying, by the processor, from the member submission and the one or more additional member submissions, a highest rated member submission.

2. The method of claim 1, comprising applying, to a member account associated with the highest rated member submission, an indication of rank.

3. The method of claim 1, wherein the action sport activity is a skateboard trick.

4. The method of claim 1, wherein the competition is associated with a sponsor.

5. The method of claim 1, wherein the location information comprises GPS data.

6. The method of claim 1, wherein the plurality of members comprise at least one team of members.

7. The method of claim 1, wherein accessing the one or more additional member submissions comprises accessing a competing member submission, wherein the member submission and the competing member submission correspond to a competition between members of an action sports activity community.

8. The method of claim 7, comprising, prior to receiving the member submission, identifying a first member associated with the member submission and a second member associated with the competing member submission.

9. The method of claim 8, wherein the first member and the second member are identified based on one or more of a geographic region, an age range, a skill level, and an indication of interest in participation in randomly-selected competition.

10. A system comprising:
   a processor; and
   a memory having instructions stored thereon, wherein the instructions, when executed, cause the processor to:
      receive, over a network from a remote computing device, a member submission comprising a) a video comprising an action sport activity, b) location information identifying a location of video capture, and c) member identifying information;
      provide, to a plurality of members, network-based access to reviewing the video, wherein
         providing the network-based access comprises providing a control configured, upon selection, to submit a rating associated with the video, and
         network-based access is provided based upon one or more of i) a location identification, received from a respective member of the plurality of members, identifying a geographic location within a predetermined range of the location of video capture,
  ii) a member identification, received in relation to the member submission, of two or more particular members of the plurality of members,
  iii) an activity identification, received from a respective member of the plurality of members, identifying the action sport activity, and
  iv) a competition identification, received from a respective member of the plurality of members, wherein the member submission was submitted in relation to a competition identified by the competition identification;

receive, from at least a subset of the plurality of members, responsive to providing access to reviewing the video, a respective rating;

determine, based upon a plurality of ratings received from the subset of the plurality of members, an overall rating;

access one or more additional member submissions, wherein the one or more additional member submissions share at least one of the location of video capture, the competition identification, and the activity identification; and identify, from the member submission and the one or more additional member submissions, a highest rated member submission.

11. A non-transitory computer readable medium having instructions stored thereon, wherein the instructions, when executed, cause a processor to:

receive, over a network from a remote computing device, a member submission comprising a) a video comprising an action sport activity, b) location information identifying a location of video capture, and c) member identifying information;

provide, to a plurality of members, network-based access to reviewing the video, wherein
  providing the network-based access comprises providing a control configured, upon selection, to submit a rating associated with the video, and
  network-based access is provided based upon one or more of
    i) a location identification, received from a respective member of the plurality of members, identifying a geographic location within a predetermined range of the location of video capture,
    ii) a member identification, received in relation to the member submission, of two or more particular members of the plurality of members,
    iii) an activity identification, received from a respective member of the plurality of members, identifying the action sport activity, and
    iv) a competition identification, received from a respective member of the plurality of members, wherein the member submission was submitted in relation to a competition identified by the competition identification;

receive, from at least a subset of the plurality of members, responsive to providing access to reviewing the video, a respective rating;

determine, based upon a plurality of ratings received from the subset of the plurality of members, an overall rating;

access one or more additional member submissions, wherein the one or more additional member submissions share at least one of the location of video capture, the competition identification, and the activity identification; and identify, from the member submission and the one or more additional member submissions, a highest rated member submission.

* * * * *